(No Model.)
G. C. BRANDRIFF.
RUNNING GEAR FOR PLOWS.
No. 412,592. Patented Oct. 8, 1889.
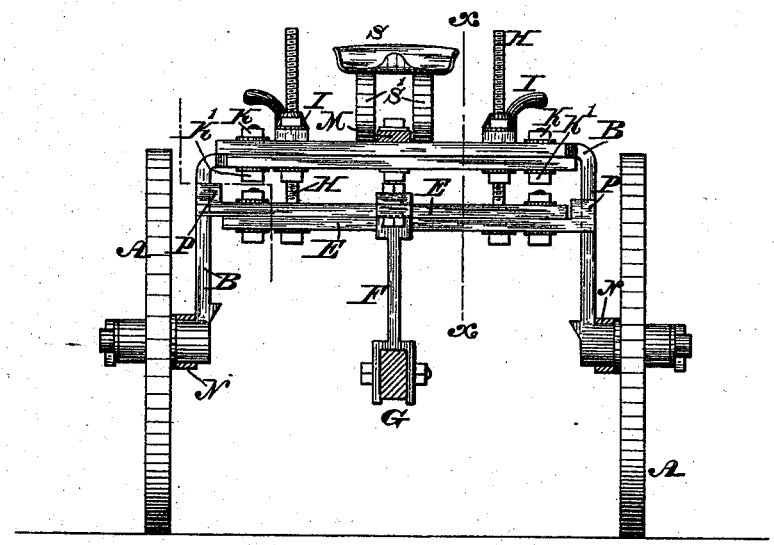
WITNESSES:
Jas. F. Kelly
L. Douville
INVENTOR:
Geo. C. Brandriff
BY Niedersheim & Kintner
ATTORNEY.

UNITED STATES PATENT OFFICE.

GEORGE C. BRANDRIFF, OF SOUTH VINELAND, NEW JERSEY.

RUNNING-GEAR FOR PLOWS.

SPECIFICATION forming part of Letters Patent No. 412,552, dated October 8, 1889.

Application filed July 9, 1887. Renewed September 7, 1889. Serial No. 323,256. (No model.)

*To all whom it may concern:*

Be it known that I, GEORGE C. BRANDRIFF, a citizen of the United States, residing at South Vineland, in the county of Cumberland, State of New Jersey, have invented a new and useful Improvement in Running-Gear for Plows, &c., which improvement is fully set forth in the following specification and accompanying drawings.

My invention relates to improvements in running-gear for plows and other farm implements of kindred nature; and to this end it consists in a wheeled vehicle having extensible axles and adjustable parts therefor, as will be hereinafter described, and particularly pointed out in the claims which follow this specification.

The object of my invention is to provide farm implements with a wheeled carriage having adjustable axles, so as to furnish a vehicle of any desired breadth of tread, and also to provide means for raising and lowering an implement carried by said wheeled carriage.

Referring to the drawings, Figure 1 is a front elevation of my improved apparatus. Fig. 2 is a plan view thereof. Fig. 3 is a sectional elevation taken on line $x\,x$, Fig. 1, and seen as if looking from the left to the right of the drawings. Fig. 4 is a similar sectional elevation on same line, seen looking to the left and showing the seat in position. Fig. 5 is a detail view of part of the plow-sustaining frame or support.

Similar letters of reference indicate corresponding parts in the several figures.

A A are the wheels such as are ordinarily used with farm implements.

B B is the frame or body of the vehicle, having axles at either side for said wheels, and made in this instance in two separable parts, adapted, as shown, to slide laterally upon each other, being adjustably held together by bolts K' K' and nuts K K, fitting in the oblong slots L L, as shown. This frame is constituted of two single standards extending up from the axle and branching into two U-shaped parts, as shown plainly in Fig. 2.

C is the tongue of the vehicle, attached to the body or frame. D is the doubletree, of well-known construction, affixed thereto.

E E constitute two parts of a frame or support for a plow. (Not shown, but hung by a vertical bar F and fixture G from below said frame.) This frame is attached to the main frame of the vehicle by screw-bolts H H, having handled nuts I I, and which are adapted to move up and down as desired. The ends of the parts E have shoulders P, adapted to work in recesses in the frame of the vehicle, as seen in Fig. 5. This arrangement permits of any desired vertical adjustment, as will be understood on inspection of the drawings.

S is the seat, supported above the frame on a spring S', and having a brace M running forward to the tongue, as seen in Fig. 4.

N N are braces running from the axles to the front part of the vehicle, and provided also with adjusting-slots L' L' and nuts for permitting lateral adjustment.

The operation of the device is obvious, as it will be understood that on simply loosening the screws and nuts in the frame the axles may be extended to any desired width permissible by the length of the parts E, B, and N. To raise and lower the plow it is only necessary to elevate or lower the bolts H H through the agency of the handle-nuts I I, which cause the parts P to slide vertically on the side of frame B.

If desired, the seat S and its support and the plow-sustaining device may be removed and the wheeled vehicle used as a cart or other carrying-vehicle.

It will thus be seen that I provide a wheeled vehicle adapted to be adjusted readily to various treads for various purposes and equally adapted for different uses, thus combining in one apparatus a simple contrivance at once cheap and useful.

Having thus described my invention, what I claim as new, and desire to secure by Letters Patent, is—

1. An adjustable gear for plows and analogous devices, consisting of the body or frame B, composed of two sections, each having a single standard with axles, the standards extending upward and having U-shaped branches, the latter being slotted and adapted to slide upon each other, and fastening devices for said sections, substantially as described.

2. The combination of the frame B, composed of sectional parts having recessed standards and slotted branches, with the plow-supports E, having shoulders P, the screw-bolts H H, and handled nuts I I, substantially as and for the purpose set forth.

3. The frame B, consisting of sectional parts, each having standards and slotted branches, in combination with braces N, having slotted parts, and means, substantially as described, for securing said parts, all combined substantially as and for the purpose set forth.

GEORGE C. BRANDRIFF.

Witnesses:
JAMES M. WELLS,
CHARLES D. WELLS.